United States Patent [19]

Mockett

[11] 4,052,334
[45] Oct. 4, 1977

[54] CATALYST SUPPORT

[75] Inventor: Keith Henry George Mockett, Alloa, Scotland

[73] Assignee: BP Chemicals Limited, London, England

[21] Appl. No.: 691,553

[22] Filed: June 1, 1976

[30] Foreign Application Priority Data

June 10, 1975 United Kingdom ............ 24789/75

[51] Int. Cl.$^2$ .................... B01J 31/02; B01J 27/24; B01J 27/06; B01J 21/08
[52] U.S. Cl. ............................ 252/429 R; 252/428; 252/438; 252/441; 252/449; 252/451
[58] Field of Search ............ 252/449, 441, 428, 438, 252/451, 429 R; 264/141, 142, 118, 56

[56] References Cited

U.S. PATENT DOCUMENTS

| 2,280,650 | 4/1942 | Kassel | 252/451 X |
| 2,643,231 | 6/1953 | Erickson | 252/448 |
| 3,647,709 | 3/1972 | Hill | 252/451 X |
| 3,657,151 | 4/1972 | Noble | 252/453 X |

FOREIGN PATENT DOCUMENTS

| 512,769 | 5/1955 | Canada | 252/451 |

Primary Examiner—Patrick P. Garvin
Assistant Examiner—William G. Wright
Attorney, Agent, or Firm—Brooks, Haidt, Haffner & Delahunty

[57] ABSTRACT

A pelleted support for catalysts suitable for use in olefin hydration to alcohols is prepared by heating to cure a shaped article formed by extrusion of a mixture of finely divided silica and colloidal silica containing 5–40% by weight of water. The presence of the specified amount of water prevents the extruded article from disintegrating on heating at elevated temperature.

8 Claims, No Drawings

CATALYST SUPPORT

The present invention relates to the production of shaped particles of pure synthetic silica suitable for use as a catalyst support. The particles may be used, for example, as a support for active metals or as a carrier for liquid phase catalysts. Typical examples of the former use are impregnation with salts of transition metals and treatment to give supported metals or alloys or oxides etc. for use in a wide range of reactions. Such catalysts are well documented in the scientific literature. An example of use as a carrier for a supported liquid phase catalyst is olefin hydration to alcohols. Here the catalyst is phosphoric acid which is contained in the pores of an essentially inert support. The latter is usually derived by purifying naturally occuring siliceous materials, e.g. diatomaceous earths or montmorillonite. Thesepurified silicates invariably contain metal oxides as impurities which react with the supported acid to give metal salts. These salts cause fouling of process equipment. Pure synthetic silicas minimise these disadvantages. Additionally pure silicas can be produced with a wider range of porosities, than that available with silicas derived from naturally occuring materials, so allowing the dispersion of active metals or supported liquids to be optimised.

Hitherto such synthetic silicas could not be obtained in sufficiently large sizes with adequate strength. In particular silica gels in chip form swell and crack in the presence of moisture and have low mechanical strength.

It has now been found that synthetic silicas of a range of porosities and having good mechanical strength can be prepared as shaped articles provided the amount of water contained therein is carefully controlled.

Accordingly, the present invention is a process for producing a pelleted silica support for catalysts comprising heating to cure a shaped article, formed from a mixture of finely divided silica powder and colloidal silica solution and containing water in the range of from 5–40% by weight of the total mixture sufficient to prevent the shaped article from disintegrating on heating at elevated temperature.

The finely divided silica powder used in forming the shaped article preferably has an average particle size in the range of 0.5 to 100 micron, most preferably in the range of 2 to 10 microns. Silica of such particle size may be produced by conventional methods. Thus, silica gels produced for example by precipitation from sodium silicate, by hydrolysis of silicate esters or by flame hydrolysis (burning in hydrogen/oxygen flame) of silicon tetrachloride may be used. Where necessary, silica gel may be ground to give the desired particle size. Examples of suitable powdered silicas include Gasil (Registered Trade Mark) and Aerosil (Registered Trade Mark).

The average size of the particles in the colloidal silica should be in the range 2 to 100 millimicrons, preferably 2 to 50 millimicrons. Ludox (Registered Trade Mark) is an example of the colloidal silica which may be used in the preparation of the siliceous support of the present invention. It may be used as supplied (ca. 27% wt/wt $SiO_2$), diluted with water or concentrated to greater $SiO_2$ contents by removal of water by evaporation.

The mixture of silica powder and colloidal silica should be a paste of such a consistency that it can be formed into a shaped article. The relative quantities of silica powder and colloidal silica required to give a paste of suitable consistency will depend to some extent on the nature of the silica used. It may be found desirable to add water to the silica powder and the colloidal silica before the mixture is formed into shaped articles. The ratio of added water, if any, to silica powder may be up to 2:1. The ratio of colloidal silica to silica powder is preferably in the range of 0.5:1 to 4:1. The optimum ratios for these components within the scope of the invention may be determined by simple tests by any person skilled in the art. Thus, using colloidal silica alone to wet powdered silica will give a shaped article of minimum pore volume; replacing some of the colloidal silica with water increases the pore volume of the shaped article.

The shaped articles of the present invention may be formed from the mixture of silica powder and colloidal silica by any suitable shaping method, e.g. extrusion through a die or by moulding. Where extrusion is used as a technique for shaping the articles it may be advantageous to add to the mixture a detergent, preferably an ionic detergent such as By-Prox (Registered Trade Mark) a long chain alkylated benezene sulfonate. In certain cases supports of increased strength have been formed by the addition of a fluoride compound such as ammonium silicofluoride to the mixture prior to extrusion.

The shaped article so formed may be of the same shape as the catalyst pellets or may be such a shape as to be readily divided to give pellets which would be convenient for filling the desired reactor. Thus, the pellets may be in the form of cylinders, preferably having a diameter of 3.5 mm and a length of between 3 to 20 mm.

The shaped article prior to heating to cure it should contain such a quantity of water that it does not disintegrate when cured. The maximum allowable quantity of water which may be present will depend to some extent on the nature of the silica powder used to prepare the shaped article, but must be between 5 and 40% by weight of the total mixture, preferably between 11 and 20% by weight of the total mixture. Where the shaped article prior to curing contains too much water, it may be dried at ambient temperature, or at relatively low temperatures of between 40° and 200° C. The duration of the drying step will depend on water content and temperature but may be for example between 2 and 24 hours.

The shaped article is then heated to cure it. In the curing step, the paste is converted to a hard material. The article is preferably heated to temperatures in the range of 300° to 900° C, in particular in the range 600° to 800° C. The duration of the heating may vary over a moderately wide range of between 2 and 24 hours.

The cured article may then be impregnated with the desired activating components and treated to give the catalytic material. This may be carried out in any convenient manner which will be known to those skilled in the art.

In the examples which follow reference has been made to various finely divided silica by their trade designation. These silicas are further identified by their properties as shown in the tabulation below:

| GASIL No. | 35 | 644 | 937 |
|---|---|---|---|
| Loose Bulk density (lb/cu ft) | 7–9 | 9 | 12–13 |
| Particle Size (microns) | 3–5 | 3–5 | 6–9 |
| Oil adsorption (ml/100 gm) | 190 | 170 | 150 |
| Surface area (sq. m/gm) | 370 | 250 | 220 |
| pH (10% suspension) | 7.0 | 2.5 | 7.0 |
| Loss on ignition (%) | 8.5 | 5.5 | 13.0 |

-continued

| GASIL No. | 35 | 644 | 937 |
|---|---|---|---|
| SiO$_2$ (% min. anhydrous) | 99.0 | 96.5 | 99.0 |

The invention is further illustrated with reference to the following Examples:

EXAMPLE 1

Gasil 644 and Ludox LS, a colloidal silica containing 27.0% SiO$_2$ were mixed thoroughly with an ionic detergent (Byprox) in the ratios:

2.43 ml Ludox per g Gasil 644
0.04 ml Byprox per g Gasil 644

The mixture was extruded through a 4.8 mm orifice, dried at room temperature overnight then calcined at 600° C for 20 hr.

EXAMPLE 2

Gasil 35, Ludox and Byprox were mixed thoroughly in the ratios:

2.00 ml Ludox per g Gasil 35
0.05 ml Byprox per g Gasil 35

The mixture was extruded through a 4.8 mm orifice, dried at 100° C for 16 hrs. and then calcined at 600° C for 20 hrs.

EXAMPLE 3

Ludox and water were mixed together, added to Gasil 937 and mixed thoroughly in the ratios:

0.72 ml Ludox per g Gasil 937
1.44 ml water per g Gasil 937

The resulting paste was extruded through a 4.8 mm orifice, dried at 20° C for 16 hrs, then at 150° C for 16 hrs. The dried extrudates were then calcined at 600° C for 20 hrs.

EXAMPLE 4

Ludox and water were mixed then blended with Gasil 937 and By-Prox added. The ratios of the components were:

0.72 ml Ludox per g Gasil 937
1.44 ml water per g Gasil 937
0.05 ml Byprox per g Gasil 937.

The resultant paste was extruded through a 4.8 mm orifice, dried at 20° C for 16 hrs. and then calcined at 600° C for 20 hours.

COMPARATIVE TESTS

The pore volumes and crush strength of the calcined extrudates from the above examples are compared with a commercial intermediate density silica gel, available only in granular form, in the following table:

| Material | Crush Resistance Index* % | Pore Volume ml/g |
|---|---|---|
| Granular ID gel | 47 | 1.14 |
| Example 1 | 66 | 0.98 |
| Example 2 | 72 | 0.91 |
| Example 3 | 49 | 1.38 |
| Example 4 | 54 | 1.19 |

*% weight retained on 3.33 aperture sieve after crushing under under a load of 700 lb.

I claim:
1. A process for producing a pelleted silica support for catalysts comprising heating to cure a shaped article, formed from a mixture of an ionic detergent, finely divided silica powder and colloidal silica and containing water in the range of 5 to 40% by weight of the total mixture sufficient to prevent the shaped article from disintegrating on heating at elevated temperature.
2. A process according to claim 1 wherein the finely divided silica powder has an average particle size in the range of 0.5 to 100 microns and the colloidal silica has an average particle size in the range of about 2 to 100 millimicrons.
3. A process according to claim 1 wherein the ratio of silica powder to the colloidal silica is in the range of 0.5:1 to 4:1.
4. A process according to claim 1 wherein the shaped article is formed from the mixture of silica powder and colloidal silica by extrusion.
5. A process according to claim 4 wherein the mixture of silica powder and colloidal silica contains in addition an inorganic fluoride compound.
6. A process according to claim 5 wherein the fluoride compound is ammonium silicofluoride.
7. A process according to claim 1 wherein prior to heating to cure the shaped article contains between 11 and 20% by weight of water.
8. A process according to claim 1 wherein the shaped article is heated to cure at a temperature in the range of 300° to 900° C.

* * * * *